(12) United States Patent
Witt

(10) Patent No.: US 6,918,028 B1
(45) Date of Patent: Jul. 12, 2005

(54) PIPELINED PROCESSOR INCLUDING A LOOSELY COUPLED SIDE PIPE

(75) Inventor: David B. Witt, Austin, TX (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/536,656

(22) Filed: Mar. 28, 2000

(51) Int. Cl.$^7$ ................................................. G06F 9/00

(52) U.S. Cl. ....................................... 712/221; 712/223

(58) Field of Search ................................ 712/221, 223

(56) References Cited

U.S. PATENT DOCUMENTS

| | | | | | |
|---|---|---|---|---|---|
| 5,442,769 | A | * | 8/1995 | Corcoran et al. | 710/316 |
| 5,463,745 | A | * | 10/1995 | Vidwans et al. | 712/218 |
| 5,490,255 | A | * | 2/1996 | Rawlinson et al. | 712/219 |
| 5,559,975 | A | * | 9/1996 | Christie et al. | 712/230 |
| 5,574,871 | A | * | 11/1996 | Hoyt et al. | 712/200 |
| 5,838,939 | A | * | 11/1998 | Sutherland | 712/200 |
| 5,931,934 | A | * | 8/1999 | Li et al. | 710/260 |
| 5,948,098 | A | * | 9/1999 | Leung et al. | 712/221 |
| 5,996,059 | A | * | 11/1999 | Porten et al. | 712/200 |
| 6,085,315 | A | * | 7/2000 | Fleck et al. | 712/241 |
| 6,345,351 | B1 | * | 2/2002 | Holmberg | 711/203 |
| 6,438,681 | B1 | * | 8/2002 | Arnold et al. | 712/216 |

OTHER PUBLICATIONS

Rosenberg, Jerry M. Dictionary of Computers, Information, Processing, & Telecommunications. Second Edition. New York; John Wiley & Sons, Inc. ©1987. pp. 353 and 649.*
MMX technology developer's guide. "Chapter 2: Overview of Processor Architecture and Pipelines". Intel Corporation. ©1997.*

* cited by examiner

Primary Examiner—Eddie Chan
Assistant Examiner—Aimee Li
(74) Attorney, Agent, or Firm—Bromberg & Sunstein LLP

(57) ABSTRACT

A digital data processor having a main pipeline to which a side pipe is loosely coupled. In particular, the side pipe is coupled to the main pipeline at a point after which an instruction entering the side pipe cannot cause an exception. When such an instruction enters the first stage of the side pipe, a copy or "ghost" of this instruction is created. While the actual instruction flows down the side pipe, this ghost instruction is allowed to flow independently down the main pipeline as if it were a non-squashable no-op. When the ghost reaches the retirement stage of the main pipeline, it is retired in normal program order, regardless of the status of the actual instruction. However, in addition, each system resource that is still waiting for a result from the actual instruction is marked appropriately. When the actual instruction finally completes in the side pipe, the only consequence, other than those local to the side pipe itself, is that any results are forwarded to the awaiting resources. If it should happen that a resource has been reallocated to a more recent instruction while the actual instruction is still in flight, the forwarded result is discarded upon arrival; otherwise, the resource is updated using the forwarded result. As a result of employing such a pipe coupling mechanism, the number of pipe stages that must be traversed by instructions other than those requiring a side pipe resource may be reduced. One disclosed example of such a side pipe is a multiply accumulate unit suitable for use in digital signal processing applications, whereby the performance of control type instructions is greatly improved.

20 Claims, 2 Drawing Sheets

| Stage | | | | Main Pipeline 4 | | |
|---|---|---|---|---|---|---|
| 1 | | | F1 | Translate | | |
| 2 | | | T1 | Transit | | |
| 3 | | | F2 | Access Icache | | |
| 4 | | | F3 | Icache Mux | | |
| 5 | | | T2 | Transit | | |
| 6 | | | F4 | Align | | |
| 7 | | | D | PC++/Decode Op | | |
| 8 | | | A1 | Predict/Access Address Reg. | | |
| 9 | | | A2 | DAG1 | - | |
| 10 | | | A3 | DAG2 | - | |
| 11 | | | T3 | Transit | | |
| 12 | | | L1 | Access Dcache | | |
| 13 | | SFU Side Pipe 8 | L2 | Dcache Mux/Access Data Reg. | | MAC Side Pipe 6 |
| 14 | S1 | SFU 1 | X1 | Main ALU | M1 | Booths | - |
| 15 | S2 | SFU 2 | R | Forward/Retire | M2 | Multiply 1 | - |
| 16 | S3 | SFU 3 | | | M3 | Multiply 2 | - |
| 17 | RS | Forward | | | M4 | Multiply 3 | - |
| 18 | | | | | AC | Accumulate/Saturate | - |
| 19 | | | | | X2 | MAC ALU | |
| 20 | | | | | RM | Forward | |

Data Processor 2

Stage

| 1 | F | I_Fetch |
|---|---|---------|
| 2 | D | Decode  |
| 3 | R | Read    |
| 4 | X | Execute |
| 5 | W | Write   |

--Prior Art--
FIG. 1

Stage

| 1  | F | Access I_Cache |    |                   |
|----|---|----------------|----|-------------------|
| 2  | T | Transit        |    |                   |
| 3  | D | Decode         |    |                   |
| 4  | I | OoO Issue      |    |                   |
| 5  | R | Read Regs      | A  | Calculate Address |
| +1 | - |                | C1 | Access D_Cache    |
| +1 | - |                | C2 | Transit           |
| 6  | X | Execute        |    |                   |
| 7  | W | Write Regs     |    |                   |

--Prior Art--
FIG. 2

Stage

| 1  | F | I_Fetch    |   |     |
|----|---|------------|---|-----|
| 2  | D | Decode     |   |     |
| 3  | A | DAG        |   |     |
| 4  | R | Read Regs  |   |     |
| +1 | - |            | M | MAC |
| 5  | X | Execute    |   |     |
| 6  | W | Write Regs |   |     |

--Prior Art--
FIG. 3

| Stage | Main Pipeline 4 | | SFU Side Pipe 8 | | MAC Side Pipe 6 | |
|---|---|---|---|---|---|---|
| 1 | F1 | Translate | | | | |
| 2 | T1 | Transit | | | | |
| 3 | F2 | Access Icache | | | | |
| 4 | F3 | Icache Mux | | | | |
| 5 | T2 | Transit | | | | |
| 6 | F4 | Align | | | | |
| 7 | D | PC++/Decode Op | | | | |
| 8 | A1 | Predict/Access Address Reg. | | | | |
| 9 | A2 | DAG1 | | | | |
| 10 | A3 | DAG2 | | | | |
| 11 | T3 | Transit | | | | |
| 12 | L1 | Access Dcache | | | | |
| 13 | L2 | Dcache Mux/Access Data Reg. | | | | |
| 14 | X1 | Main ALU | S1 | SFU 1 | M1 | Booths |
| 15 | R | Forward/Retire | S2 | SFU 2 | M2 | Multiply 1 |
| 16 | | | S3 | SFU 3 | M3 | Multiply 2 |
| 17 | | | RS | Forward | M4 | Multiply 3 |
| 18 | | | | | AC | Accumulate/Saturate |
| 19 | | | | | X2 | MAC ALU |
| 20 | | | | | RM | Forward |

Data Processor 2
Fig. 4

PIPELINED PROCESSOR INCLUDING A LOOSELY COUPLED SIDE PIPE

FIELD OF THE INVENTION

The present invention relates generally to pipelined digital data processing systems, and, in particular, to a pipelined digital data processor having loosely coupled side pipes.

BACKGROUND OF THE INVENTION

Digital processing of analog signals is critical to many important commercial applications, including such diverse fields as telecommunication networks, audio and video presentation devices, and computer controlled systems. Such applications typically utilize classic time-invariant algorithms, such as digital filtering and Fourier transforms. Although differing in their implementation details, these algorithms share a common characteristic: dependence upon a basic mathematical operation—the multiply and accumulate ("MAC"). In a "MAC operation", a first data operand is multiplied by a second data operand, and the product is added to the current contents of an "accumulator". In most such applications, the speed with which a MAC operation is performed is considered critical.

If the data operands are themselves simply elements of data operand "vectors", as is often the case, each MAC operation requires pre-loading of an appropriate pair of operands using respective access address "pointers" into the data vectors, and then post-modification of each of the pointers according to a specific address access pattern. Typically, the access patterns are different for each of the data vectors. In some applications, one (or both) of the data vectors may be too large to fit into available system memory at one time, thus requiring further overhead to move each over-sized vector through a conveniently sized "buffer" which is allocated in either system or local memory. In general, each buffer is specified in terms of a starting "base address" and a "modulo" length, and the operands in that buffer are accessed according to an access pattern having a particular step "offset" size. In many algorithms, at least one of the buffers is accessed in a modulo manner, wherein a pointer that steps beyond the end of the buffer is wrapped, modulo the length of the buffer, back into the buffer. For the purpose of the description that follows, I will use the term "circular buffer" to refer to any memory-based data buffer which is accessed in such a modulo manner, regardless of whether or not the size of the buffer is less than or equal to the size of the data vector which may be stored therein.

In general, it is the presence of an execution unit ("EU") especially designed to efficiently perform an atomic MAC operation that distinguishes a digital signal processor ("DSP") from a general purpose digital data processor. In view of the importance of timely supplying the MAC EU with operands, many DSPs incorporate a pair of special purpose data address generators ("DAGs") to assist the load/store unit ("LSU") in supplying operands to the MAC EU. In such DSPs, a single atomic "MAC instruction" may be provided to allow a programmer to specify both the details of the MAC operation and, via special purpose registers, the characteristics of each of the operand access patterns.

It has occurred to me that application of conventional microprocessor design concepts to DSPs should prove beneficial for numerous reasons. First, the majority of DSP algorithms involve loops. Second, DSP algorithms tend to be computationally intensive. Third, DSP application code is usually relatively small, with relatively few conditional branches, thus reducing the control logic required for branch prediction. Fourth, many modern DSPs have dedicated hardware for loop operations. Finally, the results of such operations are often only interim results which are consumed within the loop and never used again, thus reducing register pressure and traffic through the LSU.

Shown in FIG. 1 is a 5-stage pipeline typical of a simple in-order issue microprocessor or microcontroller. In such a pipeline, all instructions traverse all stages and may encounter an "interlock" or "stall" at each stage boundary, depending upon a number of conditions, including, for example, the state of the instructions further down the pipeline, current unavailability of necessary hardware resources, or register conflicts (typically referred to as "hazards"). Shown in FIG. 2 is a deeper 7-stage pipeline typical of a classic out-of-order ("OoO") issue microprocessor, such as the "Alpha", originally designed by engineers working for the Digital Equipment Company. In this pipeline, after the OoO Issue stage, multiple instructions may be "in flight", but regardless of the actual time of "completion", all will be "retired" in strict program order. In such a machine, the LSU can be represented as a "side pipe" which is "tightly coupled" to the main pipe, in that its operation is fully interlocked with respect to the main pipeline (illustrated in FIG. 2 by a heavy dashed line between stages 4 and 5 of the main pipe flow). Thus, although most instructions experience only Seven (7) stages of "latency", loads and stores have a latency of Nine (9).

In general, any pipe stage capable of generating a "synchronous exception" (including both "traps", such as an overflow trap, and "faults", such as a page fault) must be interlocked. For convenience of reference, I shall hereafter refer to such stages as "interlockable stages". One disadvantage of interlocking is that, once a particular interlockable stage is interlocked, instructions traversing the preceding stages in the pipeline will back up pending release of the interlock. One partial solution is, as in the Alpha, to provide an OoO issue mechanism. However, the amount of hardware necessary to support OoO operation is quite substantial, and, in any event, is still constrained to a limited number of instructions simultaneously in-flight in the EUs. In effect, the bottleneck is simply shifted (at significant expense in hardware, power, etc.) from the issue stage to a common write-back/retire stage. It has occurred to me, however, that an instruction can be defined such that, after a certain point in the pipe, it is, by definition, incapable of generating synchronous exceptions. It is therefore theoretically possible to "retire" such an instruction any time after that instruction has traversed the last stage in the pipe at which that instruction can provoke an interlock! By "decoupling" such an instruction from the strict in-order retirement portion of the pipeline, subsequent instructions in program order can also be retired before the decoupled instruction has actually completed execution. Of course, if a decoupled instruction is such that it will ultimately deliver a result back to an architectural register, then the register allocation and update mechanism must make appropriate allowances to detect and resolve data hazards (including "read after write", "write after read", and "write after write"). In general, however, the write-back time slot allocation mechanism should not need significant modification since the total amount of traffic and the number of competing sources will still be the same. What is really needed is a mechanism for "decoupling" an instruction such that it is eligible for retirement as soon as it is no longer capable of generating any synchronous exceptions.

For the purpose of making relative performance comparisons in the description that follows, I shall estimate circuit performance in terms of "units of delay", wherein I define One (1) unit of delay as the time required for an input signal to traverse a typical 3-input NAND gate and settle to the correct output logic level at the input of the next level of logic. I will assume that such a typical gate would be implemented, using current state of the art semiconductor manufacturing processes, as a single, contiguous physical unit or cell of minimal sized transistors with minimum inter-transistor wiring. In all estimates that I shall make herein, I will also assume that, within each discrete functional unit, such as an adder, all requisite gates comprise a single, contiguous physical unit or super-cell so as to minimize inter-gate wiring.

In the field of general purpose digital data processors, it has been demonstrated that considerable improvement in performance can be achieved by employing a very deep pipeline, on the order of Twelve (12) stages or more, and increasing the clock rate accordingly. In general, the clock rate is determined by the pipeline stage having the longest critical speed path. In high performance processors, careful attention is given to partitioning the pipeline so as to balance the relative speed paths through each stage. A significant imbalance may indicate the desirability of splitting that stage into multiple stages or of augmenting that stage with additional hardware resources. In either case, the consequences on relative cost to performance must be considered.

In a modem deeply pipelined microprocessor, such as the Alpha, the clock-cyde-limiting pipe stage is considered to consist of an input latch, a minimum arithmetic logic unit ("ALU") operation, and result forwarding back to the input latch, requiring about Eleven (11) delay units using current state of the art design techniques. Such a design allows single-cyde ALU forwarding, while achieving high clock frequency rates. It is also dose to the minimum time required to drive and sample a state of the art memory array, such as a 64×64 static random access memory ("SRAM") array.

In modern DSPs, the longest stage of the processing "pipeline" is the single-cycle MAC EU, and the dock rate is set accordingly. Shown in FIG. 3 is a 6-stage pipeline typical of such a conventional DSP, wherein the MAC can be represented as a tightly-coupled side pipe. Using current state of the art logic design, the critical speed path through a MAC EU is approximately Forty (40) delay units. Using a state of the art 0.18 micron manufacturing process, One (1) delay unit is approximately One Hundred (100) picoseconds Thus, the maximum clock rate for such a design would be on the order of Two Hundred Fifty (250) MHz. In contrast, the critical speed path through a current state of the art DAG is approximately Twenty (20) delay units. Since the DAG is already twice as fast as it needs to be to keep up with the MAC EU, there has been little incentive to improve its performance, particularly since such improvement would come only at the cost of additional hardware, power consumption, waste heat, etc.

If contemporary deep pipelining design techniques could be effectively applied to the MAC in a DSP, one might expect to realize commensurate improvement in system performance. However, just deeply-pipelining the MAC is not sufficient to achieve the desired 11-delay-unit clock cycle:, the clock-cycle-limiting stage is now the DAG! I have shown a DAG capable of sustained operation at an 11-delay-unit clock cycle in my co-pending U.S. application Ser. No. 90/537,020, entitled "Modulo Address Generation Method and Apparatus", filed contemporaneously herewith and incorporated herein by reference ("Co-pending Application"). Accordingly, a need now exists for a deeply pipelined MAC, the longest stage of which has a critical speed path on the order of Eleven (11) delay units.

SUMMARY OF THE INVENTION

A data processor and data processing system are disclosed. The data processor includes a main pipeline and a side pipe which is loosely coupled the main pipeline. The side pipe may include a plurality of side pipes. Similarly, the main pipe may include a plurality of main pipes. In such a configuration, the side pipe is coupled to the main pipeline only at a selected one of the plurality of main pipe stages. In other embodiments, the main pipeline may have its own side pipe.

In certain embodiments, the main pipe sequentially fetches an instruction and prepares the instruction for execution and issues the prepared instruction and a ghost of the prepared instruction. If a second main pipe stage is coupled to the first main pipe stage, the second main pipe state receives and then retires the ghost of the prepared instruction. In such an embodiment, the side pipe receives and executes the prepared instruction. The data processing system may include memory from which the first instruction into the pipeline is provided.

In another embodiment, there is a first and a second main pipe stage. The second pipe stage is coupled to a last stage of the first main pipe stage and it cooperates to receive and then retire a ghost of the prepared instruction. The side pipe is coupled to the last stage of the first main pipe and cooperates to receive and execute the prepared instruction. It should be understood that more than one instruction may be passed through the pipeline.

BRIEF DESCRIPTION OF THE DRAWINGS

My invention may be more fully understood by a description of certain preferred embodiments in conjunction with the attached drawings in which:

FIG. 1 illustrates, in pipeline diagram form, a simple prior art digital data processor;

FIG. 2 illustrates, in pipeline diagram form, a more deeply pipelined prior art data processor;

FIG. 3 illustrates, in pipeline diagram form, a simple prior art digital signal processor;

FIG. 4 illustrates, in pipeline diagram form, a data processor constructed in accordance with my invention to support loosely coupled side pipes.

In the following descriptions of the preferred embodiments of my invention, similar elements will be similarly numbered whenever possible. However, this practice is simply for convenience of reference and to avoid unnecessary proliferation of numbers, and is not intended to imply or suggest that my invention requires identity in either function or structure in the several embodiments. In general, in the description that follows, I will italicize the first occurrence of each special term of art which should be familiar to those skilled in the art of data processor design. When I first introduce a term that I believe to be new or that I will use in a context that I believe to be new, I will bold the term and then provide the definition that I intend to apply to that term.

DETAILED DESCRIPTION OF THE PREFERRED EMBODIMENTS

Shown in FIG. 4 is a data processor 2, the principal hardware components of which are arranged so as to form a main pipeline 4 which is specially constructed in accordance with my invention to support both tightly coupled and loosely coupled side pipes. By tightly coupled, I mean side pipes, such as prior art LSUs, that are fully interlocked to the main pipeline, and in which all instructions flowing through the side pipe must necessarily return to the main pipeline for normal retirement. By loosely coupled, I mean side pipes that have Two (2) unique characteristics: first, the only time that the side pipe can stall an instruction in the stage in the main pipe to which the side pipe is coupled is when that instruction needs to use that side pipe and, at the time that instruction is eligible for transfer to that side pipe, the side pipe is incapable of accepting that instruction, i.e., a resource allocation conflict; and, second, the only other interaction allowed between the side pipe and the main pipe is that the side pipe may forward results to an architectural resource, such as a register file. In particular, no instruction can generate a synchronous exception once it has entered a loosely coupled side pipe. It follows therefore that, from the perspective of the main pipeline, an instruction, once it has entered a loosely coupled side pipe, can be retired in program order whenever convenient, regardless of the actual status of that instruction, so long as appropriate provisions have been made to accommodate post-retirement forwarding of results from the side pipe. By way of example in FIG. 4, I have included Two (2) side pipes that are loosely coupled to the main pipeline 4: a MAC side pipe 6, and a Special Function Unit or SFU side pipe 8.

In Stage 1 ("F1"), the current fetch address, which is maintained in a virtual form, is translated using a conventional address translator, into a corresponding physical form. In Stage 2 ("T1"), the fetch address, in physical form, transits from the translator to the instruction cache (Icache). In some instances, if the transit requires less than a full clock, then the address translator can be allowed additional time to resolve. Of course, if physical addressing is desired, these stages can be eliminated.

In Stage 3 ("F2"), the Icache is initially accessed using the physical fetch address. Typically, a multi-way, set-associative cache organization will be used, and the data array will be partitioned into a set of fast sub-arrays of fixed size. If Icache timing is tight, all that is required is that the bit/*bit line differentials coming out of each of the sub-arrays be captured by the end of Stage 3. In Stage 4 ("F3"), the outputs of the appropriate data sub-array, comprising a line of instruction fields, are muxed out. In Stage 5 ("T2"), the selected line transits to an instruction aligner. If desired, Stage 5 may also incorporate a small, fast loop buffer or perhaps a prefetch queue to facilitate fast access to a small set of recently accessed instructions.

In Stage 6 ("F4"), the aligner first determines the length of the current instruction by decoding the opcode field, which, as will be seen, is itself located on a selected boundary. Then, the aligner shifts the line (and perhaps One (1) or more subsequent lines) so that the opcode field of the next instruction is aligned on the selected boundary (and thus the next instruction is pre-positioned to become the current instruction in the next clock cycle). Simultaneously, the aligner extracts from the line(s) all fields of the current instruction. When operation is first initiated or upon a change of flow (including jumps, branches, loops, interrupts, exceptions, and the like), the first instruction in the new flow will need to be fetched in a known alignment. For excessively long, variable-length instructions, which one would usually expect to occur only rarely, it may be necessary to extend this stage for One (1) or perhaps more additional clock cycles to provide sufficient time to locate and extract all instruction fields. If data processor 2 executes only fixed length instructions, this stage may be eliminated.

In Stage 7 ("D"), the opcode is first decoded to determine the requisite major function. The next PC is then calculated, taking into consideration those major functions that involve a change of flow, including loops, jumps and branches. If branch prediction is desired, next PC calculation may need to extend into Stage 8 to provide sufficient time for the predictor to resolve and update its tables. Any of the conventional predictors may be employed for this purpose.

In Stage 8 ("A1"), the architectural registers designated by corresponding fields in the current instruction as containing operand addresses are accessed. A typical example of such an address would be the location in the memory system of an operand to be loaded and operated upon. In the case of a typical MAC instruction, a pair of load address registers would be designated, each representing a respective One (1) of the operands to be multiplied. If register renaming is provided, the renamed registers are accessed as appropriate. Any of the conventional renaming mechanisms may be employed for this purpose.

Stages 9 ("A2") and 10 ("A3"), may comprise the pipelined MAG shown in my Co-pending Application. Instructions that do not require use of the DAG may be rendered "transparent" to those units, that is, the units will treat such instructions as if they were no-ops. Another way to think of this technique is to imagine that, from the viewpoint of such instructions, the DAG units appear "transparent", that is, as if they were not even there. Thus, in effect, instructions that do no DAG operations are simply forwarded, in program order, through stages 9 and 10, behind any preceding instructions that may be using the DAG in units. Some modest amount of conventional control logic in stages 9 and 10 will be required to implement the forwarding mechanism, which I have illustrated in FIG. 4 as boxes on the right edge of the pipe flow.

In Stage 11 ("T3"), the load address(es) transit to the data cache (Dcache). In Stage 12 ("L1"), access to the Dcache is initiated. As was the case with the Icache, it is sufficient that the data sub-array differentials be captured by the end of Stage 12. In Stage 13 ("L2"), the outputs of the appropriate data sub-array, comprising One (1) or more operands, are muxed out. If the instruction, rather than requiring a load from the memory system (including the Dcache) designates a selected One (1) or more of the architectural registers, the access to the register file (including any renamed registers) is performed in Stage 13. If desired, a store buffer may provided, to which the load addresses transit in Stage 11, access is initiated in Stage 12, and completed in Stage 13.

In Stage 14 ("X1"), the main ALU performs the operation designated by a normal current instruction on the selected operand(s). By normal, I mean an instruction that does not require the use of the special hardware resources that I have partitioned off into the side pipes. In Stage 15 ("R"), the results of the operation are forwarded to the register file (and any renamed registers, as appropriate), and the current instruction is retired. Note that loads and stores were initiated earlier in the main pipeline 4, so that only the retire (and register rename update) must be performed in Stage 15.

Notice that, by the end of Stage 13, all actions have been accomplished necessary to issue the current instruction to an EU. In particular, each designated operand has been fetched and any exceptions which might be triggered thereby have been resolved. Thus, other than exceptions which may occur as a result of the actual operation to be performed on the operand(s) (and normal stalls pending return of requested operands from the memory system), the current instruction is safe to issue. It is, therefore, at this point in the main pipeline 4 that in I couple the MAC side pipe 6 and SFU side pipe 8. Assuming all issue constraints are satisfied, an instruction which requires use of the MAC hardware will be issued into the MAC side pipe 6 at the end of Stage 13 of the main pipeline 4. Similarly, assuming all issue constraints are satisfied, an instruction which requires use of the special function unit ("SFU") hardware (which may perform any of a large number of operations) will be issued into the SFU side pipe 8 at the end of Stage 13. For convenience, I will refer to all instructions that require a side pipe resource as special.

Assuming for the moment that a 16×16 MAC operation is issued into the MAC side pipe 6, then, in Stage 14 ("M1"), a Booth's recoder recodes selected sets of bits of the multiplier operand to reduce the number of required additions to Nine (9). In Stage 15 ("M2"), the first Two (2) 3:2 carry save adder ("CSA") levels of a Wallace tree multiplier reduce the number of remaining additions to Four (4). In Stage 16 ("M3"), the next Two (2) CSA levels of the tree further reduce the number of remaining additions to One (1). In Stage 17 ("M4"), a carry propagate adder ("CPA") completes the 16×16 multiplication and provides the 33-bit product. In Stage 18 ("AC"), a 40-bit accumulator adds the product to the current accumulated sum. If, as a result of the accumulation, the accumulator overflows/underflows, and saturation is enabled, the value in the accumulator is set to the maximum/minimum possible values, respectively. Thus, at the end of Stage 18, the sum is available for immediate forwarding back into the accumulator for the next MAC instruction, which might be poised to enter Stage 18 on the next clock cycle.

In Stage 19 ("X2"), I recommend providing a MAC ALU that can support common DSP algorithms, such as a fast Fourier transform ("FFT"), such ALUs being well known in the art. Finally, in Stage 20 ("FM"), the result of the MAC instruction is forwarded to all relevant facilities, if any, including the architectural register file (and any currently renamed registers), the store buffer, the top of the MAC side pipe 6 (at Stage 14), and back to the MAC ALU (at Stage 19). To facilitate result forwarding, the respective destination pointers and tags need to propagate though each of the stages of the MAC side pipe 6 in parallel with the current instruction status and partial result information. I would expect actual writeback of a result to an architectural/rename register or the store buffer to occur during the next dock cycle, thereby providing maximum flight time to such resources should they be physically remote from the MAC EU. Of course, for an instruction that needs the MAC ALU but not the multiplier or accumulator hardware resources (or vice versa), those unneeded resource(s) can be rendered transparent and the instruction allowed to flow silently through any unessential stage(s).

In the stylized SFU that I have depicted as the SFU side pipe 8, which might, for example, be a floating point ALU, I have provided Three (3) functional stages, Stages 14–16 ("S1"–"S3"), in which to perform the requisite operation(s), and a forwarding stage, Stage 17 ("FS"). In operation, the SFU side pipe 8 functions similar to the MAC side pipe 6, but performs the particular special function operation(s).

When a special instruction is ready to be issued into a side pipe, a replica or ghost is made, consisting of sufficient state information relating to the special instruction to allow the ghost to be retired as if it were indeed that special instruction. Thus, the ghost will typically comprise a copy of the special instruction's PC value and destination register designator(s), if any. However, unlike the special instruction, the op-code portion of the ghost will be made to appear as if it were a non-squashable no-op to downstream stages. By non-squashable, I mean an instruction that, although it results in no substantive operations (other than PC update), must be allowed to proceed to normal retirement rather than being discarded earlier in the main pipeline 4. When the special instruction is actually issued into the side pipe, the ghost will also be simultaneously issued into the next stage of the main pipeline 4. The ghost will thereafter proceed as if it were a normal instruction, moving from stage to stage in the main pipeline 4 in accordance with each stage's entry criteria. In effect, the ghost will fill the bubble in the main pipeline 4 that would otherwise result from the forking of the special instruction into the side pipe, and preserve the in-order character of the main pipeline 4.

In the illustrated form of my main pipeline 4, the ghost will be issued directly into Stage 14 where it will result in no ALU operation. On the next clock cycle, the ghost will normally enter Stage 15 where it will be retired. As in the case of a normal instruction, the retirement of the ghost will result in the update of the architectural PC. In contrast, however, the destination register(s), if any, designated by the ghost will be marked as pending. By pending, I mean that the instruction that is expected to deliver a result to that register has retired, but that result has not yet been forwarded to that register. As a result, a normal instruction which designates that particular destination register as a source register will stall in Stage 13. Thereafter, when the special instruction finally reaches the Forward Stage in the side pipe, the result will actually be forwarded to the designated register (and any waiting in-stage hardware), thereby releasing the stalled instruction. If, on the other hand, the "next" instruction in Stage 13 is itself special and is about to be issued into the same side pipe as the special instruction that gave rise to the ghost, then that next special instruction can proceed to issue, since the required result will be locally forwarded within the side pipe itself.

Note that it is entirely possible that, by the time a special instruction finally reaches the Forward Stage in a side pipe, an intervening normal instruction has already overwritten the designated destination register. For example, in many typical DSP algorithms, a result of a particular MAC instruction may be merely an intermediate result that will be used only as in input to a subsequent (but nearby in program order) MAC instruction, and thus will be consumed entirely within the MAC side pipe 6 (and need not ever be delivered back to an architectural register). Since such write-after-write hazards are usually resolved at compilation or assembly time, the data processor 2 can safely assume that this is the intended result. In such an event, the retirement of the intervening normal instruction will result in the pending flag being reset on the destination register. Thereafter, when the special instruction forwards the result, the register file will detect that the delivered result is now stale and will simple discard it. In either event, all residual allocated state resources (such as rename registers, tags, and the like) will be released when the special instruction reaches the Forward Stage.

In general, my side pipe mechanism may be used to advantage to implement any functional hardware arrangement which satisfies the Two (2) basic constraints: first, the only time that the side pipe can stall an instruction in the stage in the main pipe to which the side pipe is coupled is when that instruction needs to use that side pipe and, at the time that instruction is eligible for transfer to that side pipe, the side pipe is incapable of accepting that instruction; and, second, the only other interaction allowed between the side pipe and the main pipe is that the side pipe may forward results to an architectural resource. In the event that a subsequent instruction flowing down the main pipeline 4 requires the result of an operation that is in flight in a side pipe, it will usually stall at the stage to which the side pipe is coupled until that result has been forwarded from the side pipe. However, by using convention forwarding logic, the stalled instruction can proceed as soon as the result arrives, and need not wait until the result has actually been written back into the respective architectural register. Some instructions, such as stores, may be permitted to continue down the main pipeline 4 and be retired (since address faults were identified and resolved earlier in the main pipeline 4), so long as provision has been made to update the store buffer when the result is finally delivered by the side pipe.

In response to a change of flow instruction, such as a jump, branch or loop, the data processor 2 initiates fetching and execution of instructions starting at the target address, while the main pipeline 4 and all side pipes continue to drain. In the event of a synchronous exception, such as an address fault, the data processor 2 initiates fetching and execution of an appropriate fault handler, while the main pipeline 4 and all side pipes continue to drain all instructions that precede the faulting instruction in program order. In the event of an asynchronous exception, such as an externally-generated interrupt, the data processor 2 responds in a conventional way, allowing the main pipeline 4 to drain while the appropriate interrupt handler is being fetched.

Thus it is apparent that I have provided a pipeline architecture for a data processor that is adapted to support loosely coupled side pipes. Those skilled in the art will recognize that modifications and variations can be made without departing from the spirit of my invention. Therefore, I intend that my invention encompass all such variations and modifications as fall within the scope of the appended claims.

I claim:

1. A data processor comprising:
   i. A main pipeline; and
   ii. A side pipe which is loosely coupled to said main pipeline such that an instruction, which is executable later in the main pipeline, is placed into the side pipe when the instruction is no longer capable of causing a synchronous exception with the main pipeline.

2. The data of claim 1 wherein:
   the main pipeline is comprised of a plurality of main pipe stages; and
   the side pipe is comprised of at least one side pipe stage; the side pipe stage being coupled to said main pipeline only at a selected one of said plurality of main pipe stages.

3. The data processor of claim 2, wherein the main pipeline is further characterized as being comprised of first and second main pipe stages, and wherein said side pipe stage is coupled to the first main pipe stage and to said second main pipe stage.

4. The data processor of claim 1 wherein:
   the main pipeline is further characterized as comprising:
      at least a first main pipe stage which sequentially fetches an instruction, prepares said instruction for execution, and issues the prepared instruction and a ghost of the prepared instruction;
      at least a second main pipe stage, coupled to the fist main pipe stage, which receives and then retires the ghost of the prepared instruction; and the side pipe is further characterized as comprising:
      at least a first side stage, coupled to the first main pipe stage, which receives and executes the prepared instruction.

5. A data processing system comprising the data processor of claim 4 and a memory which provides the instruction to the first main pipe stage.

6. The data processor of claim 1 wherein:
   the main pipeline is further characterized as comprising:
      a first set of main pipe stages which cooperate to fetch an instruction, prepare the instruction for execution, and issue the prepared instruction and a ghost of the prepared instruction;
      a second set of main pipe stages, a first stage of which is coupled to a last stage of said first set of main pipe stages, which cooperate to receive and then retire the ghost of the prepared instruction; and the side pipe is further characterized as comprising:
      first set of side pipe stages, a first stage of which is coupled to said last stage of said first set of main pipe stages, which cooperate to receive and execute the prepared instruction.

7. A data processing system comprising the data processor of claim 6 and a memory which provides the instruction fetched by a first stage of said first set of main pipe stages.

8. The data processor of claim 1 wherein:
   the main pipeline is further characterized as comprising;
      at least a first main pipe stage which sequentially fetches in a selected program order first and second instructions, prepares for each for execution, and issues the prepared first instruction, the prepared second instruction, and a ghost of the prepared second instruction; and
      at least a second main pipe stage, coupled to the first main pipe stage, which receives, executes, and then retires the first instruction, and receives and then reties the ghost of the second instruction; and
   the side pipe is further characterized as comprising:
      at least a first side pipe stage, coupled to the first main pipe stage, which receives and executes the second instruction.

9. A data processing system comprising the data processor of claim 8 and a memory which provides the first and second instructions to the first main pipe stage.

10. The data processor of claim 1 wherein:
    the main pipeline is further characterized as comprising:
       a first set of main pipe stages which cooperate to sequentially fetch in a selected program order first and second instructions, prepare each for execution, and issue the prepared first instruction, the prepared second instruction, and a ghost of the prepared second instruction;
       a second set of main pipe stages, a first stage of which is coupled to a last stage of said first set of main pipe stages, which cooperate to receive, execute, and then retire the first instruction, and to receive and then retire the ghost of the second instruction; and
    the side pipe is further characterized as comprising:
       a first set of side pipe stages, a first stage of which is coupled to said last stage of said first set of main pipe stages, which cooperate to receive and execute the second instruction.

11. A data processing system comprising the data processor of claim 10 and a memory which provides the first and second instructions to the first stage of said first set of main pipe stages.

12. The data processor of claim 1 further characterize as comprising a second side pipe which is also loosely coupled to said main pipeline.

13. The data processor of claim 12 wherein:
    the main pipeline is comprised of a plurality of main pipe stages; and
    each side pipe is comprised of at least one side pipe stage, and said side pipe stage being coupled to said main pipeline only at a selected one of said plurality of main pipe stages.

14. A pipeline architecture for use in a data processor comprising:

i. A main pipeline and;

ii. A side pipe loosely coupled to said main pipeline such that an instruction, which is executable later in the main pipeline, is placed into the side pipe when the instruction is no longer capable of causing a synchronous exception with the main pipeline.

15. The pipeline architecture of claim 14 wherein:

the main pipeline is comprised of a plurality of main pipe stages; and the side pipe is comprised of at least one side pipe stage, the side pipe stage being coupled to said main pipeline only at a selected one of said plurality of main pipe stages.

16. The pipeline architecture of claim 15 wherein the main pipeline is further characterized as being comprised of first and second main pipe stages, and wherein said side pipe stage is coupled to the first main pipe stage and to said second main pipe stage.

17. The pipeline architecture of claim 14 wherein:

the main pipeline is further characterized as comprising:

at least a first main pipe stage which fetches an instruction, prepares said instruction for execution, and issues the prepared instruction and a ghost of the prepared instruction;

at least a second main pipe stage, coupled to the first main pipe stage, which receives and then retires the ghost of the prepared instruction; and the side pipe is further characterized as comprising:

at least a first side pipe stage, coupled to the first main pipe stage, which receives and executes the prepared instruction.

18. The pipeline architecture of claim 14 wherein:

the main pipeline is further characterized as comprising:

a first set of main pipe stages which cooperate to fetch an instruction, prepare the instruction for execution, and issue the prepared instruction and a ghost of the prepared instruction;

a second set of main pipe stages, the first stage of which is coupled to the last stage of said first set of main pipe stages, which cooperate to receive and then retire the ghost of the prepared instruction; and the side pipe is further characterized as comprising:

a first set of side pipe stages, the first stage of which is coupled to the last stage of said first set of main pipe stages, which cooperate to receive and execute the prepared instruction.

19. The pipeline architecture of claim 14 wherein:

the main pipeline stage which sequentially fetches in a selected program order first and second instructions, prepares each for execution, and issues the prepared first instruction, the prepared second instruction, and a ghost of the prepared second instruction;

at least a second main pipe stage, coupled to the first main pipe stage, which receives, executes, and then retires the first instruction, and receives and then retires the ghost of the second instruction; and the side pipe is further characterized as comprising:

at least a first side pipe stage, coupled to the first main pipe stage, which receives and executes the second instruction.

20. The pipeline architecture of claim 14 wherein:

the main pipeline is further characterized as comprising:

a first set of main pipe stages which cooperate to sequentially fetch in a selected program order first and second instructions, prepare each for execution, and issue the prepared first instruction, the prepared second instruction, and a ghost of the prepared second instruction;

a second set of main pipe stages, the first stage of which is coupled to the last stage of said first set of main pipe stages, which cooperate to receive, execute, and then retire the first instruction, and to receive and then retire the ghost of the second instruction; and the side pipe is further characterized as comprising:

a first set of side pipe stages, the fist stage of which is coupled to the last stage of said first set of main pipe stages, which cooperate to receive and execute the second instruction.

* * * * *

UNITED STATES PATENT AND TRADEMARK OFFICE
CERTIFICATE OF CORRECTION

PATENT NO. : 6,918,028 B1
DATED : July 12, 2005
INVENTOR(S) : David B. Witt

Page 1 of 1

It is certified that error appears in the above-identified patent and that said Letters Patent is hereby corrected as shown below:

<u>Column 9,</u>
Line 58, replace "fist" with -- first --.

<u>Column 10,</u>
Line 12, insert -- a -- before "first".
Line 29, replace "reties" with -- retries --.
Line 58, replace "characterize" with -- characterized --.

Signed and Sealed this

Sixth Day of September, 2005

JON W. DUDAS
*Director of the United States Patent and Trademark Office*